C. W. Cardot.
Friction Clutch.
Nº 90,992. Patented June 8, 1869.
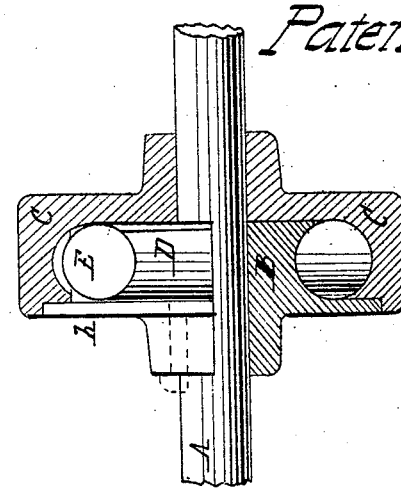
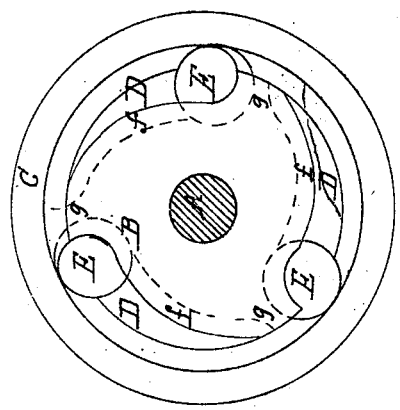
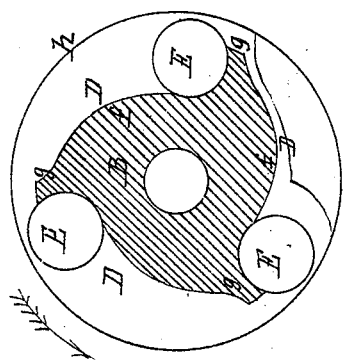
Witnesses
Edward Wilhelm
Victor H. Becker
C. W. Cardot Inventor
by Forbush & Hyatt

United States Patent Office.

C. W. CARDOT, OF JAMESTOWN, NEW YORK.

Letters Patent No. 90,992, dated June 8, 1869.

IMPROVEMENT IN FRICTION-CLUTCH.

The Schedule referred to in these Letters Patent and making part of the same.

*To all whom it may concern:*

Be it known that I, C. W. CARDOT, of Jamestown, in the county of Chautauqua, and State of New York, have invented a certain new and improved Ratchet-Hub; and I do hereby declare that the following is a full and exact description thereof, reference being had to the accompanying drawings, making part of this specification.

It is frequently required, in machines of various kinds, to connect wheels or pulleys to their shafts, so that the motion of the one will be communicated to the other when turned in one direction only. This is commonly accomplished by fitting the wheel or pulley loosely upon the shaft, and providing it with pawls, which engage the teeth of a ratchet-wheel securely keyed to the shaft, so that when the shaft turns in one direction, the pawls will engage the ratchet-teeth, and move the wheel, but slip over them when it is turned in the other.

In some instances friction-rollers, acting between the ratchet-teeth and a circular flange on the hub of the wheel, have been substituted for the pawls, and it is to a device of this kind that my improvement relates; and My invention consists in making the ratchet-teeth and circular flange with concave grooves, so as to receive rollers of spherical form, whereby greater durability is obtained, and also a more perfect and reliable action of the rollers.

In the drawings—

Figure I is a cross-section of the shaft and sleeve, showing the end of the ratchet-hub in elevation.

Figure II is a longitudinal section of the same.

Figure III is a cross-section of the hub detached.

Like letters of reference designate like parts in each of the figures.

In the drawings—

A represents a shaft.

B, the ratchet-hub secured thereon.

C, the sleeve, or case in which the latter fits and revolves. This sleeve, or case forms the hub or a part of the hub of the wheel or pulley to be driven.

D D, the depressions formed in the periphery of the hub, and

E E, the balls, or wedges fitting therein.

The depressions D are formed so as to gradually increase in depth on one side, and form an incline, or cam-surface, $f$, while the other side, from the deepest portion of the recess, is abrupt, so as to form a sudden stop, $g$, for the balls, as shown.

The hub is provided with a flange, $h$, that partially overlaps the open end of the case $c$, as represented in Fig. II.

This case is cast with a circular cavity, to receive the hub and balls, the latter being of such size as to fit loosely in the depressions, or ratchets D when in the deepest portion.

The periphery of the hub and the corresponding inner surface of the case are formed with a circular groove, to conform to the balls which operate between the two.

The operation of my improvement is as follows:

The hub being revolved in the direction indicated by the arrows, the balls remaining in the deepest portion of the recesses will be carried around with it. On stopping the motion of the hub, or attempting to reverse its movement, one or more of the balls will, by their gravity, fall and wedge in the converging channel, between the eccentric surface $f$ and the case, the tendency of a reverse movement of the hub being to wedge the ball still more firmly between the two, and prevent any independent rotation in that direction, while an opposite movement will immediately release the balls and permit the hub to freely revolve.

It is evident that the depressions for the balls may be formed in the inner surface of the case, or sleeve, and the periphery of the hub be left a circle; also, that it is immaterial which is the driver, the hub, or the case.

My improved device is specially applicable to mowing and harvesting-machines, but may be employed as a substitute for the ordinary ratchet-devices for preventing the backward motion of machinery, or for converting reciprocating into forward motion. It will operate with the axis of the hub in a horizontal position, as shown, or with the axis inclined or perpendicular. In order to operate with the shaft vertical, the grooves, or channels in the hub, or sleeve for the balls, should be made to run spirally, to an extent sufficient to cause the latter to gravitate therein.

What I claim as my invention, and desire to secure by Letters Patent, is—

The combination of the hub B, having concave eccentric faces $f$, the concave grooved sleeve C, and balls E E, as herein set forth and described.

C. W. CARDOT.

Witnesses:
JOSEPHUS H. CLARK,
MOSES M. MOORE.